July 29, 1958 F. X. REIMSPIESS 2,845,134
INDIVIDUAL WHEEL SUSPENSION FOR THE DRIVING
WHEELS OF AUTOMOTIVE VEHICLES
Filed May 14, 1953
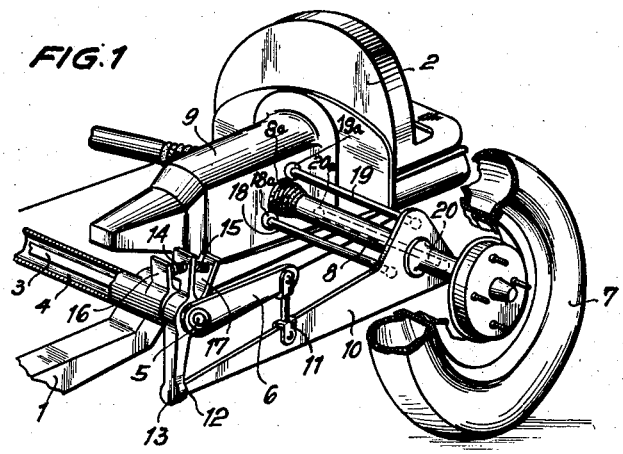
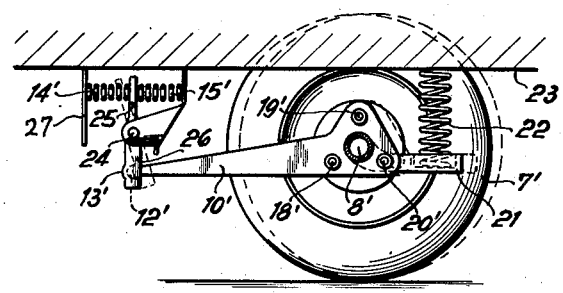
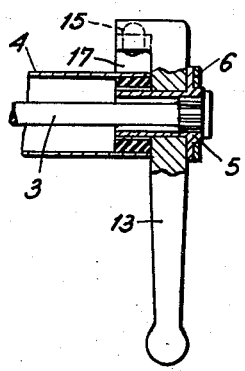
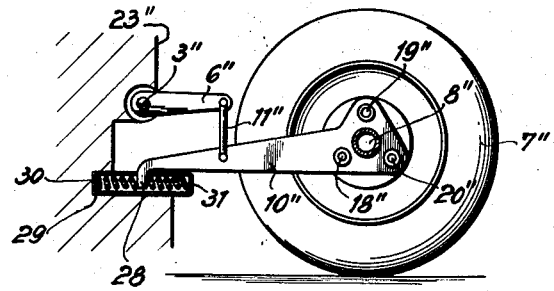
INVENTOR:
Franz Xaver Reimspiess

United States Patent Office 2,845,134
Patented July 29, 1958

2,845,134

INDIVIDUAL WHEEL SUSPENSION FOR THE DRIVING WHEELS OF AUTOMOTIVE VEHICLES

Franz Xaver Reimspiess, Stuttgart, Germany, assignor to Dr. Ing. h. c. F. Porsche K.-G., Stuttgart, Zuffenhausen, Germany Application May 14, 1953, Serial No. 354,991

Claims priority, application Germany May 28, 1952

6 Claims. (Cl. 180—73)

This invention relates to improvements in individual wheel suspension for the driving wheels of motor vehicles, and more particularly to an individual wheel suspension for absorbing shocks and other forces which act on the wheels, particularly in a horizontal direction longitudinally of the vehicle.

In known types of wheel suspensions links are provided which guide the wheels, such links being elastically supported on the frame of the vehicle by means of rubber segments. In these constructions, however, the rubber segments must be installed with an initial tension which limits their flexibility so that they are quite insufficient to absorb horizontal shocks resulting in the transmission of such shocks to the frame of the vehicle practically undiminished.

The primary object of the invention is to provide an individual wheel suspension which will avoid the drawbacks of prior wheel suspension and provide one which will readily take up and absorb both longitudinal and vertical forces or shocks.

In accordance with the invention the disadvantages of prior constructions are overcome by providing a rocking brace for each driving wheel which is rigidly connected with the wheel axle and movably supported with respect to the body or cushioned part of the vehicle for movement longitudinally thereof. This construction provides a resilient soft cushioning of the driving wheels both in the vertical and horizontal directions.

In one form of construction where a torsion rod or bar spring is employed for the vertical support of the wheels by means of longitudinal guides or arms which swing in the direction of travel of the vehicle, the improved rocking braces for the driving wheels are respectively connected with the extending or free ends of the longitudinal guides or arms extending from the torsion bar by means of connecting links or articulated supports. In this construction, the longitudinal movements, moments or forces absorbed by the rocking brace are transmitted to a double arm lever which is biased against rocking by means of helical springs. In order to obtain a spatially straight guide of the driving wheels, guiding members swingably supported in vertical and horizontal directions are respectively hinged to the rocking braces of the wheels. A space saving arrangement, with links swinging in the direction of travel of the vehicle, is obtained by movably supporting the double arm lever for each driving wheel on the supporting journal of the links.

In a modified construction, the rocking brace may be offset at one end which is movably guided in a sleeve between helical springs. This arrangement results in a simple support for the rocking brace in which the double arm lever is omitted.

The invention includes other features, objects and advantages described in detail hereinafter in connection with the accompanying drawings showing exemplary embodiments of the invention.

In the drawings:

Fig. 1 is a broken perspective view of the improved individual wheel suspension of the present invention illustrated in connection with only one of the driving wheels of an automotive vehicle;

Fig. 2 is a side view partly in longitudinal section of a modified form of construction;

Fig. 3 is a view similar to that of Fig. 2 showing another form of the improved wheel suspension; and Fig. 4 is a fragmentary broken view partly in section showing the details of construction of a portion of the wheel suspension mechanism shown in Fig. 1.

In the embodiment shown in Fig. 1 of the drawings, the automotive vehicle includes a frame 1 supporting a drive aggregate or driving mechanism 2 in a known manner. The cushioning effect between the driving wheels and the body of the vehicle is obtained by means of a torsion rod spring 3 located in a hollow transverse support 4 extending transversely to the longitudinal central plane of the vehicle and mounted on the body of the vehicle. Since the wheel suspension for the driving wheels is the same for both sides of the vehicle, only one side is illustrated in Fig. 1 and described herein. The free ends of the torsion rod spring 3 extend respectively into supporting journals or trunnions 5, each end being connected in a non-rotatable manner with the journal 5, for example by splines as shown in Fig. 4, the journal 5 being fixed to one end of a longitudinally extending arm 6. A driving wheel 7 is supported on a swingable wheel axle 8, the inner end of which is attached to an axle housing 9 by means of a ball and socket joint 8a.

A rocking brace 10, one end of which is fixed to the axle 8, extends longitudinally of the vehicle and is connected with the free or swingable end of the longitudinal arm 6 by an articulated support or connecting link 11, the attachment of the link 11 to the brace 10 being intermediate the ends of the latter. The end of the rocking brace extending away from the wheel axle 8 is connected by a ball and socket joint 12 with the lower end of an upwardly extending double arm lever 13, which is pivotally or rotatably supported intermediate its ends on the journal 5 of the arm 6, the journal 5 extending into the hollow transverse support 4. In the construction described in connection with Fig. 1 and shown more in detail in Fig. 4, it will be noted that the end of the torsion spring 3 extends into or through the supporting journal or trunnion 5 and is fixed against rotation with respect thereto by a conventional type of keying means as shown. In this figure the journal 5 is shown as a flanged sleeve section, a portion of which extends into the hollow transverse support 4 and on which the double armed lever 13 is pivoted. One end of the arm 6 is fixed to the outer portion of the journal 5 so that the end of the torsion rod spring 3 is connected with the longitudinal arm 6 by means of the supporting journal 5. The lever 13 is biased against rotation or pivoting in either direction, respectively, by oppositely mounted helical springs 14 and 15 arranged under compression and bearing against the upper end of the lever 13. The helical springs 14 and 15 are held in place against the end of the lever 13 by means of spaced upwardly projecting lugs 16 and 17, respectively, fixed to the support 4. The upper end of the lever 13 includes a portion extending between the lugs 16 and 17 which is engaged by the helical springs 14 and 15, as shown in Fig. 1. The lugs 16 and 17 also serve as stops for limiting the longitudinal movement of the rocking brace 10.

The wheel 7 is guided by three regularly-spaced guiding members 18, 19 and 20 extending parallel to the axle 8 and in spaced relation thereto. At one end the guiding members 18, 19 and 20 are hinged to the web of the rocking brace 10 and their other ends are supported by the housing 9 in ball and socket joints 18a, 19a and 20a. The ends of the guiding members 18, 19 and 20 may be hinged to the web of the brace 10 in any suitable manner.

When the wheel 7 is deflected in a direction perpendicular to the travel of the vehicle, the torsion spring rod 3 via the connecting link 11 and the arm 6 is positively twisted by the rocking brace 10, which yields in the direction of the deflecting movement, the end of the axle 8 attached to the wheel also moving in the same manner. In this action the shock is absorbed by the spring 3. If obstacles located in the direction of travel are struck by the wheel 7, the movements which would result in this action are also absorbed by the rocking brace 10 and transmitted to the double arm lever 13, which is movably supported on the cushioned part of the vehicle and which transmits the moments to the helical springs 14 and 15. In these movements of the wheel 7, spatially straight guidance is obtained by means of the guiding members 18, 19 and 20, which at one end are hinged to the rocking brace 10 and at the other end to the axle housing 9, since these members are located in spaced relation to the axle 8 and at 120° with respect to each other, with one of the members 19, located directly above the axle 8. The independent wheel suspension and associated mechanism shown and described in connection with Fig. 1 provides a soft space saving flexible support for the driving wheels which is distinguished by excellent riding comfort.

Fig. 2 shows an embodiment of the invention in which the perpendicular or vertical movements of the driving wheels of the motor vehicle with respect to the road are cushioned by helical springs instead of by the torsion bar spring 3. In other respects, similar elements shown in Fig. 2 are referred to by the same reference characters as in Fig. 1, to which a prime has been added. In this view, the axle 8' is provided with a longitudinally-extending bracket 21 for each wheel, for holding a helical spring 22 the upper end of which bears against the under portion of the body 23 of the vehicle. The bracket 21 projects from the opposite side of the axle 8' from that of the brace 10'.

As shown in Fig. 2, the rocking brace 10', which is rigidly connected at one end to the axle 8', is, at its other end, supported in a ball and socket joint 12' at the free end of the lower arm 26 of the double arm lever 13'. In this case, the lever 13' is directly supported on the body 23 by means of a bracket 24, the upper arm 25 of the lever being biased to its normal position by means of helical springs 14' and 15', the latter of which also bears against a portion of the bracket 24. The helical spring 14' bears against a fixed bracket or stop 27 fixed to the body 23. The driving wheels of the vehicle shown in Fig. 2 are guided in the same manner as in the embodiment shown in Fig. 1, by the hinged guiding members or rods 18', 19' and 20'.

In Fig. 2, the broken line showing of the wheel 7' and the suspension mechanism associated therewith is that of a position of the wheel and mechanism during the movement of the wheel 7' relative to the body in a longitudinal direction horizontal to the road. When this movement takes place, the upper arm 25 of the double arm lever 13' moves toward the left further compressing the spring 14', which, in being compressed, resists and cushions the movement. At the same time, the lower arm 26 with the brace 10' moves backward with the wheel and the axle 8'. When the wheel 7' is deflected vertically, its movement is cushioned by the helical spring 22. In this action, the axle 8' swings upwardly with the ball and socket joint 12' as a pivot point. It is to be understood that in all embodiments of the invention, the mechanism effects cushioning of the longitudinal and vertical forces or shocks whether or not they occur simultaneously or separately.

Fig. 3 of the drawings shows a third embodiment of the invention, in which like or corresponding parts shown in Fig. 1 have the same reference characters including a double prime. This construction includes the torsion bar spring 3" mounted on the body 23", also the arm 6" and the connecting link 11". In this embodiment, the rocking brace 10" includes a right angle projection 28, at its extending end from the wheel axle 8", which is guided in a slotted longitudinally mounted sleeve 29 fixed to the body of the vehicle, the end 28 extending through the slot in the sleeve and being located between a pair of helical springs 30 and 31 mounted under compression in the sleeve. The mechanism shown in Fig. 3 functions in the same manner as that shown in Fig. 1 except that the rocking lever 13 is replaced by the sleeve 29 with the helical springs 30 and 31, thereby forming a somewhat more simple mechanism. The drive shafts for the wheels 7, 7' and 7" extend from the housing 9 through the respective axles, as will be readily understood, although they are not shown in the drawings.

It is to be understood that the invention is not limited to the embodiments of the invention specifically illustrated in the drawings, it being immaterial from the standpoint of the invention what kinds of springs are used for the elastic or cushioning support or how the rocking bracing is movably supported with respect to the cushioned or spring supported part of the vehicle.

I claim:

1. In an individual wheel suspension for the driving wheels of motor vehicles in which the motor vehicle includes a body and a pair of driving wheels mounted opposite each other, a rocking brace for each driving wheel extending longitudinally of the vehicle, an individual axle on which said wheel is mounted, one end of said rocking brace being connected with said axle adjacent to said wheel and movable with the wheel relative to the body of the vehicle, a lever pivoted intermediate its ends to the body of the vehicle adjacent the other end of the rocking brace thereby providing two lever arms, said other end of the rocking brace being attached to the free end of one of said lever arms and supported thereby from the vehicle body, spring means supporting the body of the vehicle relative to said wheel, said rocking brace together with the wheel being movable longitudinally relative to the body of the vehicle in response to shocks received by the wheel, and a second spring means operatively associated with the other lever arm for opposing the pivoting of said lever and said relative longitudinal movement of the rocking brace, whereby shocks applied in the longitudinal direction of the vehicle travel are absorbed by the second spring means and not transmitted to the vehicle body to a substantial extent.

2. An individual wheel suspension as claimed in claim 1, including a journal having an axis extending transversely of the vehicle, said lever being pivoted on said journal, an arm attached to said journal from one end and extending therefrom longitudinally of the vehicle, the extending end of said arm being movable up and down relative to the body of the vehicle and being biased downwardly by the spring means supporting the body of the vehicle relative to the wheel, and means for connecting the extending end of said arm to the rocking brace intermediate its ends, whereby the load on said arm is applied to the rocking brace and in turn to said wheel.

3. In an individual wheel suspension for the driving wheels of motor vehicles in which the motor vehicle includes a body and a pair of driving wheels mounted opposite each other, a rocking brace for each driving wheel extending longitudinally of the vehicle, an individual axle on which said wheel is mounted, one end of said rocking brace being connected with said axle adjacent to said wheel and movable with the wheel relative to the body of the vehicle, means for supporting the other end of the rocking brace from the body of the vehicle, a torsion bar spring extending transversely of the vehicle, an arm having one end fixed to one end of said torsion bar spring, said arm extending from the torsion bar spring along the rocking brace, means for connecting the extending end of said arm to the rocking brace intermediate the ends of the latter, said torsion bar spring and arm being arranged to apply a load to the rocking brace, said rocking brace together with the wheel being movable vertically in opposition to the torsion bar spring and longitudinally relative to the body of the vehicle in response to longitudinally-directed shocks received by the wheel, and spring means operatively associated with the rocking brace for opposing said relative longitudinal movement of the rocking brace, whereby shocks applied to the wheel in the longitudinal direction of travel of the vehicle are absorbed by the spring means and not transmitted to the vehicle body to a substantial extent.

4. In an individual wheel suspension for the driving wheels of motor vehicles in which the motor vehicle includes a body and a pair of driving wheels mounted opposite each other, a rocking brace for each driving wheel extending longitudinally of the vehicle, an individual axle on which said wheel is mounted, one end of said rocking brace being connected with said axle and movable with the wheel relative to the body of the vehicle, means for movably supporting the other end of the brace from the body of the vehicle, spring means supporting the body of the vehicle relative to the wheel, an arm biased by said spring means extending therefrom longitudinally of the vehicle adjacent said rocking brace, the extending end of said arm being movable up and down relative to the body of the vehicle, means for connecting said one end of the spring biased arm to the rocking brace intermediate the ends thereof, whereby the load on said spring biased arm is applied to the rocking brace and in turn to said wheel, said rocking brace together with the wheel being movable longitudinally relative to the body of the vehicle in response to shocks received by the wheel, and a second spring means operatively associated with and acting on the rocking brace to oppose said relative longitudinal movement of the rocking brace and wheel, whereby shocks applied in the longitudinal direction of travel of the vehicle are absorbed by said second spring and not transmitted to the vehicle body to a substantial extent.

5. In an individual wheel suspension for the driving wheels of motor vehicles in which the motor vehicle includes a body and a pair of driving wheels mounted opposite each other, a rocking brace for each driving wheel extending longitudinally of the vehicle, an individual axle on which said wheel is mounted, one end of said rocking brace being connected with said axle and movable with the wheel relative to the body, means for movably supporting the other end of the brace from the body of the vehicle, spring means supporting the body of the vehicle relative to the wheel, said rocking brace together with the wheel being movable longitudinally relative to the body of the vehicle in response to shocks received by the wheel, a pair of helical springs mounted under compression end-to-end lengthwise of the vehicle, and a sleeve at least partially enclosing said helical springs, said other end of said rocking brace including a portion extending into said sleeve between the adjacent ends of said helical springs, whereby said helical springs oppose said relative longitudinal movement of the rocking brace and wheel and absorb the shocks applied thereto in the longitudinal direction of travel of the vehicle.

6. In an individual wheel suspension for the driving wheels of motor vehicles in which the motor vehicle includes a body and a pair of driving wheels mounted opposite each other, a rocking brace for each driving wheel extending longitudinally of the vehicle and including a web portion located adjacent the wheel, an individual axle pivoted at its inner end with respect to the body of the vehicle, said wheel being mounted on the outer end of the axle, the web portion of said rocking brace being connected with said axle and movable with the wheel relative to the body of the vehicle, a plurality of regularly spaced guide bars extending around and substantially parallel to the axle and having their inner ends connected with respect to the body of the vehicle and their outer ends connected to said web portion of the rocking brace by means of universal joint connections, means for movably supporting the other end of the brace from the body of the vehicle, spring means supporting the body of the vehicle relative to the wheel, said rocking brace together with the wheel being movable longitudinally relative to the body of the vehicle in response to shocks received by the wheel, and a second spring means operatively associated with and acting on the rocking brace to oppose said relative longitudinal movement of the rocking brace and wheel, whereby shocks applied in the longitudinal direction of travel of the vehicle are absorbed by said second spring and not transmitted to the vehicle body to a substantial extent.

References Cited in the file of this patent

UNITED STATES PATENTS

| | | |
|---|---|---|
| 1,331,810 | Hanke | Feb. 24, 1920 |
| 1,564,733 | Weaver | Dec. 8, 1925 |
| 1,924,718 | Hallett | Aug. 29, 1933 |
| 2,012,202 | Pavlack | Aug. 20, 1935 |
| 2,062,233 | Poirier | Nov. 24, 1936 |
| 2,122,308 | Banks | June 28, 1938 |
| 2,286,609 | Ledwinka | June 16, 1942 |
| 2,689,015 | Nallinger | Sept. 14, 1954 |

FOREIGN PATENTS

| | | |
|---|---|---|
| 731,134 | France | May 24, 1932 |